Figure 1:
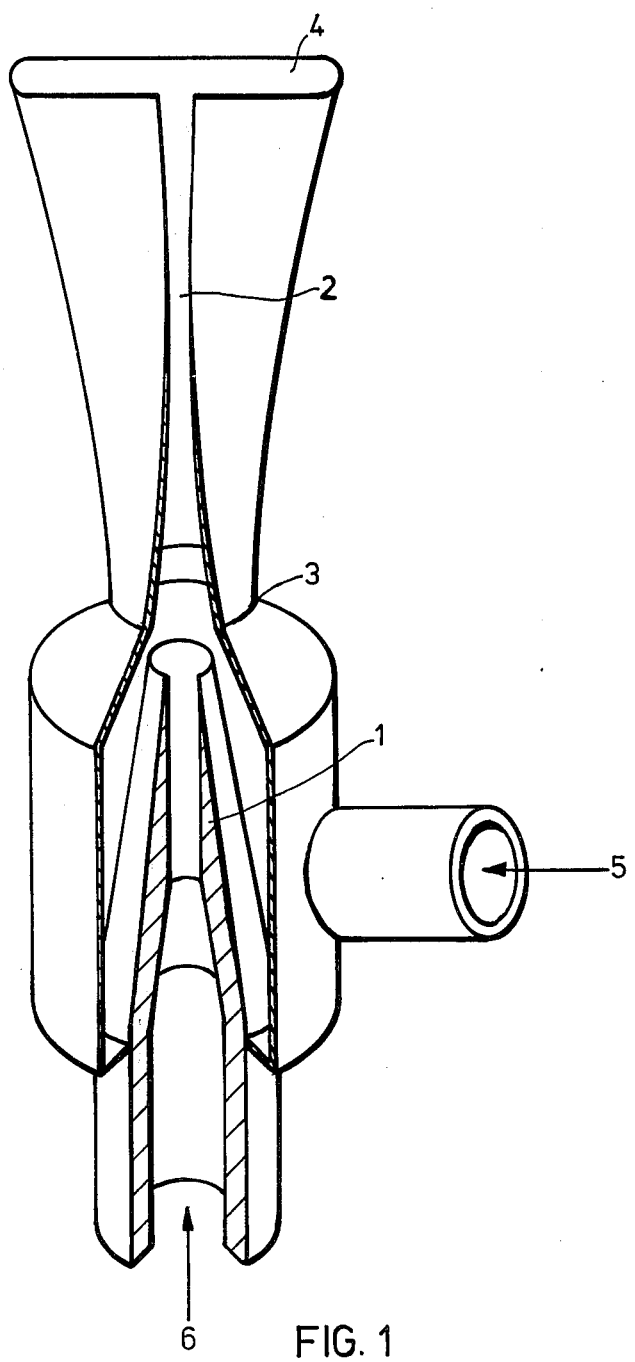

United States Patent [19]

Zlokarnik et al.

[11] 4,166,790

[45] Sep. 4, 1979

[54] SINGLE STAGE PROCESS FOR CONTINUOUS INTRODUCTION OF OXYGEN-CONTAINING GASES INTO EFFLUENT CONTAINING ACTIVATED SLUDGE

[75] Inventors: Marko Zlokarnik, Cologne; Hans Guth, Bergisch-Neukirchen; Theo Mann, Langenfeld, all of Fed. Rep. of Germany

[73] Assignee: Bayer Aktiengesellschaft, Leverkusen, Fed. Rep. of Germany

[21] Appl. No.: 790,108

[22] Filed: Apr. 22, 1977

Related U.S. Application Data

[63] Continuation-in-part of Ser. No. 677,655, Apr. 16, 1976, abandoned.

[30] Foreign Application Priority Data

Apr. 17, 1975 [DE] Fed. Rep. of Germany ....... 2516914
Feb. 9, 1977 [DE] Fed. Rep. of Germany ....... 2705243

[51] Int. Cl.² .................................................. C02C 1/12
[52] U.S. Cl. .................................... 210/15; 210/63 R
[58] Field of Search .................... 210/7, 63 R, 199, 14

[56] References Cited

U.S. PATENT DOCUMENTS

| | | | |
|---|---|---|---|
| 3,271,304 | 9/1966 | Valdespino et al. | 210/15 |
| 3,574,331 | 4/1971 | Kurosawa et al. | 210/15 |
| 4,009,100 | 2/1977 | Hess et al. | 210/15 |

*Primary Examiner*—Thomas G. Wyse
*Attorney, Agent, or Firm*—Sprung, Felfe, Horn, Lynch & Kramer

[57] ABSTRACT

A process and apparatus for the continuous introduction of air or oxygen-containing gases into an effluent containing activated sludge, the oxygen-containing gas largely being consumed by the effluent containing activated sludge in a single absorption stage, comprising introducing through a plurality of gas inlets an oxygen-containing gas into an effluent containing activated sludge which is in a basin under its own hydrostatic pressure of at least about 0.9 bar, the gas pressure of the gas introduced being about 0.01 to 0.5 bar above the hydrostatic pressure prevailing at the gas inlet, each gas inlet having a gas-swept cross-sectional area of at least about 0.01 m² which is loaded by at least about 100 effective cubic meters of gas per square meter of cross-sectional area per hour, and the individual gas inlets being separated by a distance of at least about 0.5 meter, as measured from the middle point of a gas inlet. The gas inlets may be nozzles, ejectors or apertured plates preferably spaced equidistantly from one another and each may be supplied with propulsion liquid comprising effluent containing activated sludge. Preferred ranges from the various parameters depend upon whether the gas introduced contains more or less than 50% by volume of oxygen. Special gas injectors are also provided.

6 Claims, 2 Drawing Figures

SINGLE STAGE PROCESS FOR CONTINUOUS INTRODUCTION OF OXYGEN-CONTAINING GASES INTO EFFLUENT CONTAINING ACTIVATED SLUDGE

This application is a continuation-in-part of Application Ser. No. 677,655, filed Apr. 16, 1976, now abandoned.

In the operation of a biological effluent treatment plant, the activated-sludge basin has to be supplied with the quantity of oxygen required for the metabolism of the microorganisms and a certain concentration of oxygen must be maintained to permit aerobic living conditions for bacterial culture. The oxygen required for this purpose is delivered to the liquid from the gas phase. The rate at which oxygen is supplied to the liquid from the gas is, on the one hand, governed by the size of the interface between the gas and liquid phase and by the turbulence prevailing there, while on the other hand it is directly proportional to the concentration difference $\Delta c$ between the oxygen saturation concentration and the concentration of $O_2$ dissolved in the liquid.

The phase interface is increased inter alia by using surface aerators or by introducing a gas, generally air, into the liquid and dispersing it in the liquid, optionally by means of stirrers or liquid jets (ejectors; different kind of nozzles). In the first case, the pressure in the gas-treatment zone is normal, while in the second case basins from 3 to 7 meters deep are generally used, so that a slight hydrostatic pressure prevails in the gas dispersion zone.

In general, the described method of gas treatment is carried out in open basins, with the result that the waste air escaping contains, in some cases in considerable quantities, readily volatile foul-smelling constituents which pollute the surroundings. Since atmospheric oxygen is only very incompletely utilized in the described aeration processes, the quantity of air required to satisfy the oxygen demand and, hence, the quantity of waste air as well is very considerable so that deodorization by heat treatment is very expensive.

The supply of oxygen to the liquid can be considerably accelerated by increasing the concentration difference $\Delta c$. In practice, this increase in the concentration difference $\Delta c$ can only be obtained by increasing the $O_2$-partial pressure in the gas. This can be done either by raising the system pressure or by changing from air to oxygen or an oxygen-enriched gas. However, the use of pure oxygen or of an oxygen-enriched gas requires, for economic reasons, that the gas stream be largely deprived of oxygen as it passes through the installation. When working under normal pressure, this result may be obtained by repeatedly introducing the gas stream into the liquid and/or by passing the gas through successive absorption stages (a so-called "multistage activated-sludge basin"). The production of a narrow residence-time distribution of the gas throughput by cascading the treatment zones is the subject of the process according to German Auslegeschrift No. 2,032,535.

The system pressure may be raised to increase the concentration difference $\Delta c$ by designing the activated sludge stage in the form of a tower shaft. However, this requires intensive circulation of the liquid in order to ensure that, on the one hand, the low-oxygen layers enter the intensive oxygen transport zone and, on the other hand, that the liquid is never saturated with oxygen in that zone in order to prevent outgassing and, hence, flotation of the activated sludge in areas where a lower hydrostatic pressure prevails. Circulation of the liquid may be obtained by dividing the shaft with partitions into an ascending path and a descending path (German Offenlegungsschrift No. 2,423,085).

The build-up of hydrostatic pressure in the form of a high column of liquid also has the further disadvantage that the waste water has to be pumped to a corresponding height and that the oxygen-containing gas has to be compressed to the corresponding system pressure. If such an absorption process is conducted in high towers with orifices or nozzles for the dispersion of the gas throughput arranged near the bottom, this requires, because of the poorly suppressed bubble coalescence, high energy costs for the introduction of the oxygen, since $O_2$-efficiency of the oxygen-containing gas is low.

In the single-stage activated-sludge basin, the oxygen-containing gas is passed into only a single absorption stage where it is largely deprived of oxygen. It has been found that, in the case of large treatment plants, it is not economical to carry out gas treatment outside the activated sludge basins, for example in a high tower, because in that case the supply of dissolved oxygen requires a liquid circuit that is almost impossible to establish. Thus, the input of oxygen must of necessity take place within the activated sludge stage. However, cost factors preclude designing the entire activated sludge stage in the form of a high tower.

An object of the present invention is to develop a single-stage process for the treatment of effluent in activated-sludge basins, in which the advantage of a high hydrostatic pressure is combined with the advantage of the absence of backmixing in regard to the gas phase so that the oxygen present in the gas is utilized to a high degree during only a single passage through the effluent containing activated sludge.

Another object of the invention is to provide such a process having as high as possible an efficiency of oxygen input, i.e. kg $O_2$/kWh.

Still another object is to provide such a process using air as the oxygen source and which is capable of reducing the residual oxygen content to about 6 to 9% by volume in a single absorption stage, the waste gas being capable of being thermally deodorized at about 1000° C. following the addition of fuel, e.g. heating oil, natural gas, or the like.

These and other objects and advantages are realized in accordance with the present invention pursuant to which there is provided a process for the continuous introduction of air or oxygen-containing gases into an effluent containing activated sludge, the oxygen-containing gas largely being consumed by the effluent containing activated sludge in a single absorption stage, distinguished by the fact that the oxygen-containing gas is introduced into the effluent containing activated sludge, which is under its own hydrostatic pressure, in zones where a hydrostatic pressure of at least about 0.9 bar prevails, the gas pressure of the gas introduced being about 0.01 to 0.5 bar above the hydrostatic pressure prevailing at the gas inlet, each gas inlet having a gas-swept cross-sectional area of at least about 0.01 m² which is loaded by at least about 100 effective cubic meters of gas per square meter of cross-sectional area per hour, and the individual gas inlets being separated by a distance of at least about 0.5 meters, as measured from the middle point of a gas inlet, and preferably being arranged equidistantly from one another.

The invention also relates to an apparatus for the biological treatment of effluent with a liquid level of about 10 to 40 meters, especially about 10 to 30 meters and particularly about 15 to 20 meters, of which the height-to-diameter ratio amounts to between about 5:1 and 0.5:1 and which comprises gas inlets with an individual cross-sectional area of from about 0.01 to 0.5 m² arranged substantially equidistantly from one another in the base or just above the base, preferably up to about 0.5–1 meter above the base, being separated from one another by a distance of about 0.5 to 10 meters as measured from the middle point of a gas inlet.

In accordance with another aspect of the invention, the gas inlets are in the form of injectors of which the throat diameters of the water jet nozzle are $\leq 20$ mm, preferably about 8 to 16 mm, the injectors being loaded with a gas throughput of approximately 5 to 100 effective $-m^3$ per hour and the water jet throughput being approximately 15 to 60% by volume of the gas throughput, measured in effective $-m^3$, the injectors are preferably arranged singly or in clusters at equidistant intervals, and one injector per 1 to 25 m², preferably per 1 to 5 m² of floor area of the activated sludge container is arranged up to about 1 m above the bottom, preferably in places of equal hydrostatic pressure.

It has been found that, to absorb oxygen to a high degree (80 to 90%) in a single stage, it is essential to ensure, through intensive circulation of the liquid and through rapid ascent of the swarm of gas bubbles, that no appreciable oxygen concentration gradients occur in the activated-sludge basin, and that the liquid entrained by the swarm of gas bubbles on the air-lift pump principle is not saturated with oxygen to such an extent that degassing can occur in zones where a relatively low hydrostatic pressure prevails. The measures taken in accordance with the invention provide for the treatment of effluent containing activated sludge in a single stage during which the oxygen is consumed.

It has surprisingly been found that, in cases where air is used, a waste gas containing about 6 to 9% by volume of oxygen can be obtained by the process according to the invention. By virtue of the effective utilization of oxygen in the activated sludge basin, the input of air and, hence, the quantity of waste gas as well can be reduced to one half to one third of the level normally encountered in conventional processes using air. This factor also enables the fuel demand (for example fuel oil) required for thermally deodorizing the waste air at around 1000° C. to be reduced to between one half and one third of the quantity which would normally be necessary for combustion.

The process according to the invention is preferably carried out in activated sludge basins of any cross-section ranging from about 10 to about 40 meters in depth. The height-to-diameter ratio preferably amounts to between about 5:1 and 0.5:1.

In accordance with one aspect of the invention, oxygen-containing gases containing more than 50% by volume of oxygen, including oxygen per se, are only introduced through a certain number of gas inlets, preferably through more than about 5 gas inlets. These gas inlets may be arranged either in the bottom of the activated sludge basin or just above it, preferably up to about 1 meter above the bottom of the activated-sludge basin. The gas enters the effluent containing activated sludge through these gas inlets, preferably vertically upwards, in the form of a swarm of gas bubbles. This results in the formation of "chimneys" with intensive ascending and descending circulation of liquid, the effect of which does not have to be supported by any fittings.

Based on the cross-sectional area of the activated sludge basin, one gas inlet is provided for every 0.2 to 25 m² of cross-sectional area, especially 0.2 to 15 and particularly 1 to 5 m². These gas inlets for the oxygen-containing gas have an individual outlet cross-sectional area of about 0.0002 to 0.5 m², preferably about 0.0002 to 0.0015 m², and are preferably circular or slot-shaped. However, they may also assume other forms, for example a quadratic or equilateral triangular form. In the case of a slot-shaped injector outlet the ratio of width to height is approximately 1.5 to 2:1. The oxygen-containing gas is introduced through these gas inlets into the activated sludge basin in throughputs of about 5 to 100 effective cubic meters and per unit of time (hours) (eff m³/h). The cross-sectional load at the injector exit preferably amounts to between about 2 to 8, preferably about 2 to 4, effective cubic meters/cm²h (an effective cubic meter being the volume of gas based on the gas pressure and gas temperature at the gas inlet).

The liquid throughput through the water jet nozzle of the nozzle of the injector amounts to about 15 to 60% by volume of the gas throughput, the latter being expressed in effective $-m^3$; the water jet velocities lie between approximately 10 and 20 m/sec, preferably 10 to 15 m/sec.

The gas inlets may be designed in known manner in the form of nozzles, ejectors, perforated plates, etc., which enable the oxygen-containing gas introduced to be effectively dispersed into fine gas bubbles. Ejectors (injectors) are preferred. All the gas inlets are preferably situated in zones of equal hydrostatic pressure and are arranged at a distance of about 0.5 to 10 meters (as measured from the middle point of a gas inlet). In addition, the gas inlets should be arranged as uniformly as possible over the entire cross-sectional area of the activated sludge basin.

In accordance with certain preferred combination of conditions, in one set of conditions of which Example 2 hereinbelow is illustrative, each gas inlet has a gas-swept cross-sectional area of about 0.1 to 0.5 m², preferably about 0.1 to 0.3 m², which is loaded by about 100 to 300, preferably about 150 to 250, effective cubic meters of gas per square meter of cross-sectional area per hour, the gas inlets being spaced from one another by about 2 to 10 meters, preferably about 3 to 6 meters. One gas inlet is provided for about every 8 to 12 m² of cross-sectional area. The gas introduced contains more than 50% by volume of oxygen.

In accordance with another set of perferences of which Example 1 hereinbelow is illustrative, each gas inlet has a gas-swept cross-sectional area of about 0.01 to 0.1 m², preferably about 0.05 to 0.1 m², which is loaded by about 500 to 1000 effective cubic meters of gas per square meter of cross-sectional area and hour, the gas inlets being separated by about 0.5 to 2 meters, preferably about 0.8 to 1.2 meters. One gas inlet is provided for about every 1 to 2 m² of cross-sectional area. The gas introduced contains about 20 to 50% by volume of oxygen.

In an especially preferred specific embodiment shown in FIG. 1 injectors are employed which have a slot-shaped outlet cross-section, the ratio of width to height being between about 1.5 and 2:1 and the diameter of the water jet nozzle being between about 10 and 20 mm. In the case of these injectors the mising section is so designed that it goes from a preferably circular to oval inlet cross-section to a slot-shaped outlet cross-section. Thereby the walls of the mixing section converge; this causes high shear rates in the boundary layer and favors the formation of the finest primary gas bubbles. In such injectors the gas/liquid dispersion leaves the injector in the form of a flat strip and mixes more easily into the surrounding liquid.

The fineness of the gas bubbles initially produced in the gas-treatment zone is governed by the energy applied for dispersing the gas throughput into gas bubbles. In the case of ejectors and single-orifice plates (Chemie-Ingenieur-Technik 43 (1971) 6, 329–335), this energy is generally applied by a certain liquid throughput through the gas dispersion unit. In one special embodiment of the process according to the invention, therefore, a liquid acting as propulsion liquid is introduced through the gas inlet together with the oxygen-containing gas. This liquid throughput amounts to between about 10 and 30% by volume of the gas throughput under normal conditions. It is particularly advantageous to use the effluent containing activated sludge as the propelling liquid.

While the present invention will be set forth with special regard to biological treatment of effluent it easily can be performed similarly in other biological processes, where oxygen supply is necessary, e.g. fermentation processes.

Figure 2:
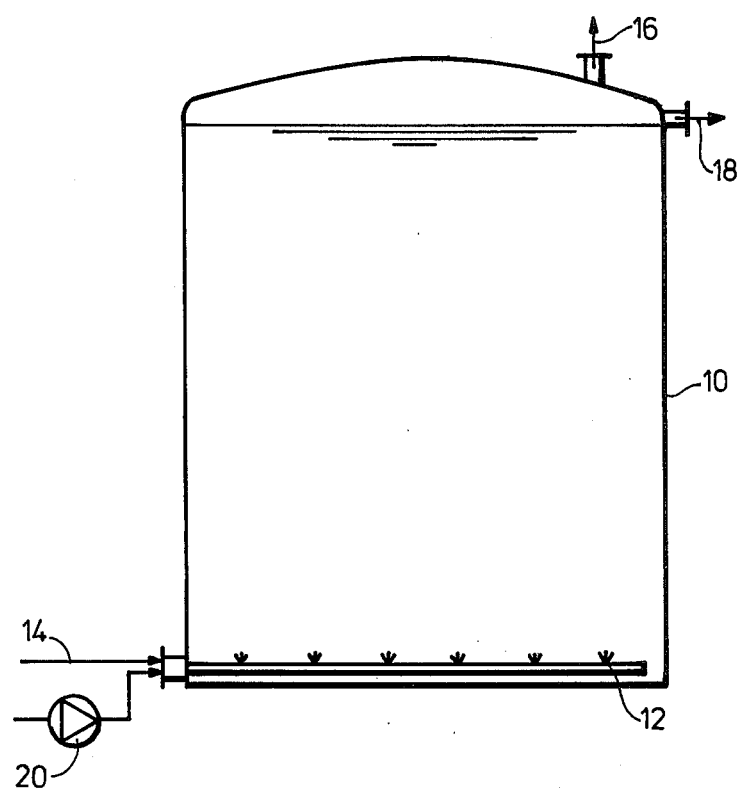

The invention is further described in the accompanying drawings wherein:

FIG. 1 is a perspective view of one preferred form of ejector with a portion broken away and shown in section; and FIG. 2 is a schematic view of an overall apparatus for carrying out the treatment of effluent in accordance with the invention.

In FIG. 1 the reference numerals identify the following elements:

1. water jet nozzle
2. mixing section
3. circular cross-section of the inlet of the mixing section
4. slot-shaped cross-section of the outlet of the mixing section
5. gas inlet
   liquid (water) inlet In FIG. 2, 10 is a cylindrical activated sludge basin provided with numerous gas ejectors 12 to which oxygen containing gas is supplied via 14. Waste gas escapes at 16, passing to a burner (not shown). Effluent overflows at 18 and through a pump 20 part of this effluent is delivered to the injectors 12 as the propulsion liquid.

All of the injectors are, if they are arranged singly, situated at points of equal hydrostatic pressure and are spaced an interval L of about 1 to 6 m, preferably about 1 to 2 m. In the case of an arrangement of the injectors in clusters the intervals are greater.

If a cluster contains Z injectors the interval from cluster to cluster increases, with an equal density of coverage (floor area per injector), according to $L \sqrt{Z}$.

If the injectors are arranged in the form of clusters, the injector outlets must be arranged in such a way that the gas-liquid free jets interrupt each other as little as possible, since this could lead to an undesired bubble coalescence.

Particularly advantageous is the use of activated-sludge-containing waste water as the jet liquid for the injectors.

It has unexpectly been found that injectors with small water jet nozzle diameters, i.e. $d \leq 20$ mm, small water jet loads are required, which is particularly important from the energy point of view; the water jet throughputs pass through the injector at a relatively low speed and cause low pressure losses on the liquid side. For these small jet throughputs a preceding filtration process to remove coarse substances in the waste water is easy to conduct. In the process according to the invention the danger of blockage of the injectors therefore does not exist.

The invention is further described in the following illustrative examples relating to processes carried out with an apparatus as described.

EXAMPLE 1

(Using Air as Aerating Gas)

An activated sludge basin with a liquid volume of 13,000 cubic meters is charged with 1300 $m^3/h$ of effluent. The oxygen demand of this installation amounts to 1400 kg/h. The oxygen concentration of the liquid amounts to 2 mg/l and the water temperature to 35° C.

The liquid level in the activated sludge basin amounts to 23 meters, the cylindrical activated sludge basin having a diameter of 27 meters (cross-sectional area of the activated sludge basin 565 $m^2$). According to the invention, the air is introduced into the liquid containing activated sludge at only 565 inlets (1 inlet per square meter), these gas inlets being arranged equidistantly (imagined as being at the corners of equilateral triangles). Ejectors (gas-treated cross-sectional area: 0.01 $m^2$) arranged about 0.5 meter above the bottom of the basin are used as the gas inlets. The throughput per ejector amounts to 4 effective cubic meters/h (=14 $Nm^3/h$) of gas and 3 $m^3/h$ of effluent containing activated sludge. This effluent containing activated sludge is taken from the activated sludge basin and delivered to the ejectors as the propulsion liquid through delivery pump(s). The excess pressure of the gas introduced at the gas inlet amounts to about 0.01 bar above the hydrostatic pressure. The waste air escaping from the activated sludge basin still contains 9.5% by volume of $O_2$ and can be burnt at a temperature of 1000° C.

EXAMPLE 2

(Using Technical Pure $O_2$ as Aerating Gas)

An activated sludge basin with a liquid volume of 6200 $m^3$ is charged with 800 $m^3/h$ of effluent. The oxygen demand of this installation amounts to 45,6 tons/day. The oxygen concentration of the liquid amounts to 6 mg/l and the water temperature to 30° C. The liquid level in the activated sludge basin amounts to 20 meters, the cylindrical activated sludge basin having a diameter of also 20 meters (cross-sectional area of the activated sludge basin 314 $m^2$). According to the invention, oxygen is introduced into the liquid containing activated sludge at only 30 inlets (one inlet to about every 10 $m^2$), these gas inlets being arranged equidistantly (imagined as being at the corners of equilateral triangles). Ejectors (cross-sectional area: 0.1 $m^2$) arranged about 0.5 meter above the bottom of the basin are used as the gas inlets. The throughput per ejector amounts to 19.4 effective cubic meters /h of gas and 6 $m^3/h$ of effluent containing activated sludge. This effluent containing activated sludge is taken from the activated sludge basin and delivered to the ejectors as the propulsion liquid through delivery pump(s). The excess pressure of the gas introduced at the gas inlet amounts to about 0.01 bar above the hydrostatic pressure. The degree of utilization amounts to 80% of the quantity of oxygen introduced.

EXAMPLE 3

(Air with Injector of FIG. 1)

An activated sludge container with a liquid volume of 10,000 m$^3$ is charged with 1,000 m$^3$ waste water per hour. The oxygen requirement of this installation is 20 tons O$_2$ per day or 833 kg O$_2$/hour. The required O$_2$ concentration in the liquid is 1 mg per liter and the water temperature is 25° C. In one run, A, the height of the liquid is 10 m and the floor area of the activated sludge container is 1,000 m$^2$; in another run, B, the height is 20 m and the floor area 500 m$^2$. In both cases injectors with a throat diameter of the water jet nozzle of 8 mm (cross-sectional area of the outlet of the mixing section: 2.3 cm$^2$) are employed and arranged equidistantly at intervals of 2 m. In the container with a height of 20 m with half the floor area there are therefore only half as many injectors.

The following operation parameters apply for case A:
height of liquid: 10 m
number of injectors: 318
gas throughput through all injectors in standard-m$^3$/h: 6200
liquid throughput through all injectors in m$^3$/h: 1330
O$_2$-content in the waste gas in % by volume: 12

The specific O$_2$ charge is 2.5 kg O$_2$/kWh, based on an efficiency of 0.6 for the compressor and an efficiency of 0.75 for the liquid pumps.

The following operating conditions apply for case B:
height of liquid: 20 m
number of injectors: 159
gas throughput through all injectors in standard-m$^3$/h: 3975
liquid throughput through all injectors in m$^3$/h: 690
O$_2$-content in waste gas in % by volume: 6.3

The specific charge of O$_2$ is in this case 2.9 kg O$_2$/kWh, based on the same efficiencies of compressor and pumps as in case A.

It will be appreciated that the instant specification and examples are set forth by way of illustration and not limitation, and that various modifications and changes may be made without departing from the spirit and scope of the present invention.

We claim:

1. A process for the continuous introduction of air or oxygen-containing gases into an effluent containing activated sludge, the oxygen largely being consumed by the effluent containing activated sludge in a single absorption stage, comprising introducing into a basin housing the activated sludge under its own hydrostatic pressure of about 0.9 to 3 bars air or oxygen-containing gas at a pressure of about 0.01 to 0.5 m head of water above the hydrostatic pressure at the point at which the gas is introduced, the gas being introduced through injectors each having a liquid jet nozzle with a throat diameter of about 8 to 16 mm, the injectors being charged with a gas throughput of about 5 to 100 effective m$^3$/h, the liquid jet throughput amounting to about 60 percent by volume of the gas throughput measured in effective m$^3$, the injectors being located up to 1 m above the basin bottom, one being provided per 1 to 5 m$^2$ of floor area of the basin.

2. A process according to claim 1, wherein each injector has an individual outlet cross-sectional area of about 2 to 15 cm$^2$.

3. A process according to claim 2, wherein each injector has a slot-shaped outlet cross-section with a ratio of width to height of about 1.5 to 2:1, the average load of each injector outlet being between about 2 to 4 effective m$^3$ gas/cm$^2$/h, the liquid jet velocity through each injector being between about 10 to 15 m/second.

4. A process according to claim 1, wherein the average load of each injector outlet is between about 2 and 8 effective m$^3$ gas/cm$^2$/h.

5. A process according to claim 1, wherein the liquid jet velocity through each injector is about 10 to 20 m/second.

6. A process according to claim 1, wherein the injectors have a slot-shaped outlet cross-section with a ratio of width to height of about 1.5 to 2:1.

* * * * *